US005274907A

United States Patent [19]

Moorehead

[11] Patent Number: 5,274,907

[45] Date of Patent: Jan. 4, 1994

[54] APPARATUS FOR WINDING A TOROID COIL ON A TOROIDAL BODY

[75] Inventor: Edward A. Moorehead, Edwardsville, Ill.

[73] Assignee: Basler Electric Company, Highland, Ill.

[21] Appl. No.: 527,743

[22] Filed: May 23, 1990

[51] Int. Cl.[5] .......... B23P 19/00

[52] U.S. Cl. .......... 29/736; 29/605; 72/135; 242/4 R

[58] Field of Search .......... 29/173, 283.5, 605, 29/729, 732, 736; 72/134, 135; 242/4

[56] References Cited

U.S. PATENT DOCUMENTS

| | | | |
|---|---|---|---|
| 1,745,928 | 2/1930 | Greenbowe | 72/135 |
| 1,795,777 | 3/1931 | Hoyt | 72/135 |
| 1,821,249 | 9/1931 | Wadsten | 72/135 |
| 2,113,428 | 4/1938 | Hanna | 72/135 |
| 2,130,396 | 9/1938 | Madden | 72/135 |
| 2,773,651 | 11/1952 | Whipple | 242/4 |
| 3,212,947 | 10/1965 | Vanzo | 242/4 R |
| 3,458,146 | 8/1967 | Warner | 242/4 |
| 3,823,590 | 7/1974 | Lang | 72/134 |
| 3,848,819 | 11/1974 | Fukushima | 242/4 |
| 3,985,310 | 10/1976 | Kent et al. | 242/4 |
| 4,379,527 | 4/1983 | Albo et al. | 242/4 |
| 4,407,337 | 10/1983 | Hines et al. | 140/124 |
| 4,467,842 | 8/1984 | Galloup et al. | 140/124 |
| 4,721,261 | 1/1988 | Kaiser et al. | 242/4 |
| 4,725,009 | 2/1988 | Fahrbach | 242/4 |
| 4,754,248 | 6/1988 | Belica | 335/210 |
| 4,872,618 | 10/1989 | Sato et al. | 242/4 |
| 5,117,668 | 6/1992 | Philpot et al. | 72/135 |

OTHER PUBLICATIONS

Brochure entitled "New & Now"; Computerized Coil Winders Inc.

*Primary Examiner*—P. W. Echols
*Assistant Examiner*—David P. Bryant
*Attorney, Agent, or Firm*—Senniger, Powers, Leavitt & Roedel

[57] ABSTRACT

Apparatus for forming a toroid coil on a toroidal body comprising a wire feeder for feeding the wire forward in the direction of its length toward the toroidal body. The wire is fed along a path which at the toroidal body is generally tangent to the surface of the toroidal body and nonparallel to the radial plane of the toroidal body. A die having a wire forming path defined therein constrains the wire to bend as it is fed forward into the convolutions of a helix extending through the opening in the toroidal body and advancing circumferentially around the toroidal body to form the toroid coil.

22 Claims, 5 Drawing Sheets

APPARATUS FOR WINDING A TOROID COIL ON A TOROIDAL BODY

BACKGROUND OF THE INVENTION

This invention relates generally to apparatus and methods for winding wire on a workpiece, and more particularly to apparatus and a method for forming a toroid coil on a toroidal body.

Wire wound toroid cores are frequently used in various types of electrical equipment. In order to optimize the electromagnetic properties of the core, it is formed as an unbroken toroidal body. However, the shape of the toroidal cores makes them difficult to wind with automatic machinery. Yet, to provide large numbers of such cores at a reasonable cost, use of machines in manufacture is mandated. Heretofore, the machines used for winding the cores have been complex and expensive. Further, the rate of completion of the final product, a wound toroidal core, has been relatively slow.

Some of these machines have a rotatable, C-shaped shuttle for carrying a leading end of wire from a source of wire. The core is positioned in the opening in the shuttle with its central opening lying on the circumferential path of the shuttle. As the shuttle rotates through the central opening of the core, wire is wrapped around the core through its central opening, with one turn of coil being formed every rotation of the shuttle. At the same time, the core is slowly rotated (manually or otherwise) on its axis of rotation so that the turns of coil advance around the circumference of the core, thus producing a toroid coil. Alternatively, the shuttle may move around the circumference of the core while the core remains stationary, to form the toroid coil. An example of such a machine is shown in Albo, U.S. Pat. No. 4,379,527. In another type of toroidal core winding machine, wire is pushed by rollers along a circular path having a large diameter in comparison with the diameter of the core. The path passes through the central opening of the core. After a full loop of wire is formed, it is released so that during the formation of the succeeding loop, the preceding loop is constricted around the core. The core must be simultaneously rotated on its axis so that the loops of wire form a toroid coil extending around the circumference of the core. An example of such a machine is shown in Sato et al., U.S. Pat. No. 4,872,618.

SUMMARY OF THE INVENTION

Among the several objects of the present invention may be noted the provision of apparatus for winding a toroid coil around a toroidal body quickly forms the toroid coil; the provision of such apparatus which minimizes the number of moving parts employed to wind the toroid coil; the provision of such apparatus which accurately controls the number of turns of coil wound on the toroidal body; the provision of such apparatus which may be easily reconfigured for toroids of different cross sectional shapes and sizes; the provision of such apparatus which simultaneously forms the primary and secondary windings of a bifilar transformer; and the provision of such apparatus which is simple in design and inexpensive to manufacture.

Still further among the several objects of the present may be noted the provision of a method for winding a toroid coil on a toroidal body which allows the toroid to be wound quickly; the provision of such a method which accurately forms the necessary number of turns of coil on the toroidal body; the provision of such a method for simultaneously forming the primary and secondary windings of a bifilar transformer; and the provision of such a method which requires minimal manipulation of the toroidal body.

Generally, apparatus for forming a toroid coil on a toroidal body constructed according to the principles of the present invention comprises means for feeding the wire forward in the direction of its length toward the toroid, and means for constraining the wire to bend it as it is fed forward into the convolutions of a helix winding around the toroidal body surface. The wire feeding means feeds the wire along a path which at the toroidal body is generally tangent to the surface of the toroidal body and nonparallel to the radial plane of the toroidal body. The convolutions of the wire formed by the wire constraining means extend through the opening in the toroidal body and advance circumferentially around the toroidal body to form the toroid coil.

In another aspect of the present invention, a method for forming a toroid coil on a toroidal body comprises the steps of feeding the wire forward in the direction of its length and constraining the wire to bend as it is fed forward into the convolutions of a helix winding around the toroidal body surface. As the wire is fed forward, it travels along a path which at the toroidal body is generally tangent to the surface of the toroidal body and nonparallel to the radial plane of the toroidal body. The convolutions of the helix so formed extend through the opening in the toroidal body and advance circumferentially around the toroidal body to form the toroid coil.

In yet another aspect of the present invention, an inductor comprising a toroidal core of magnetic material has a toroid coil wrapped around it in accordance with the method of the present invention.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
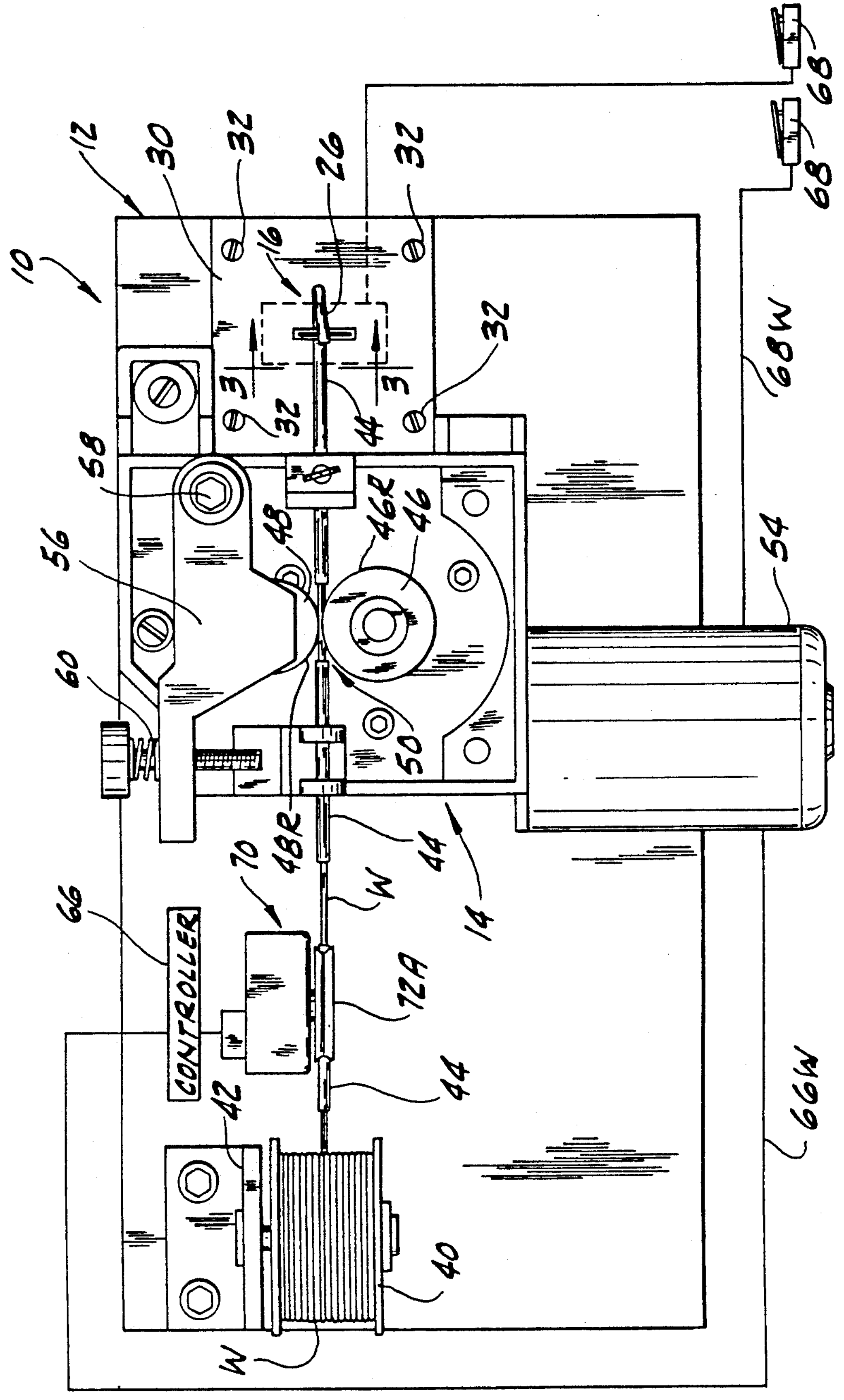
FIG. 1 is a plan view of apparatus constructed according to the principles of the present invention which shows controls for the apparatus schematically.
Figure 2:
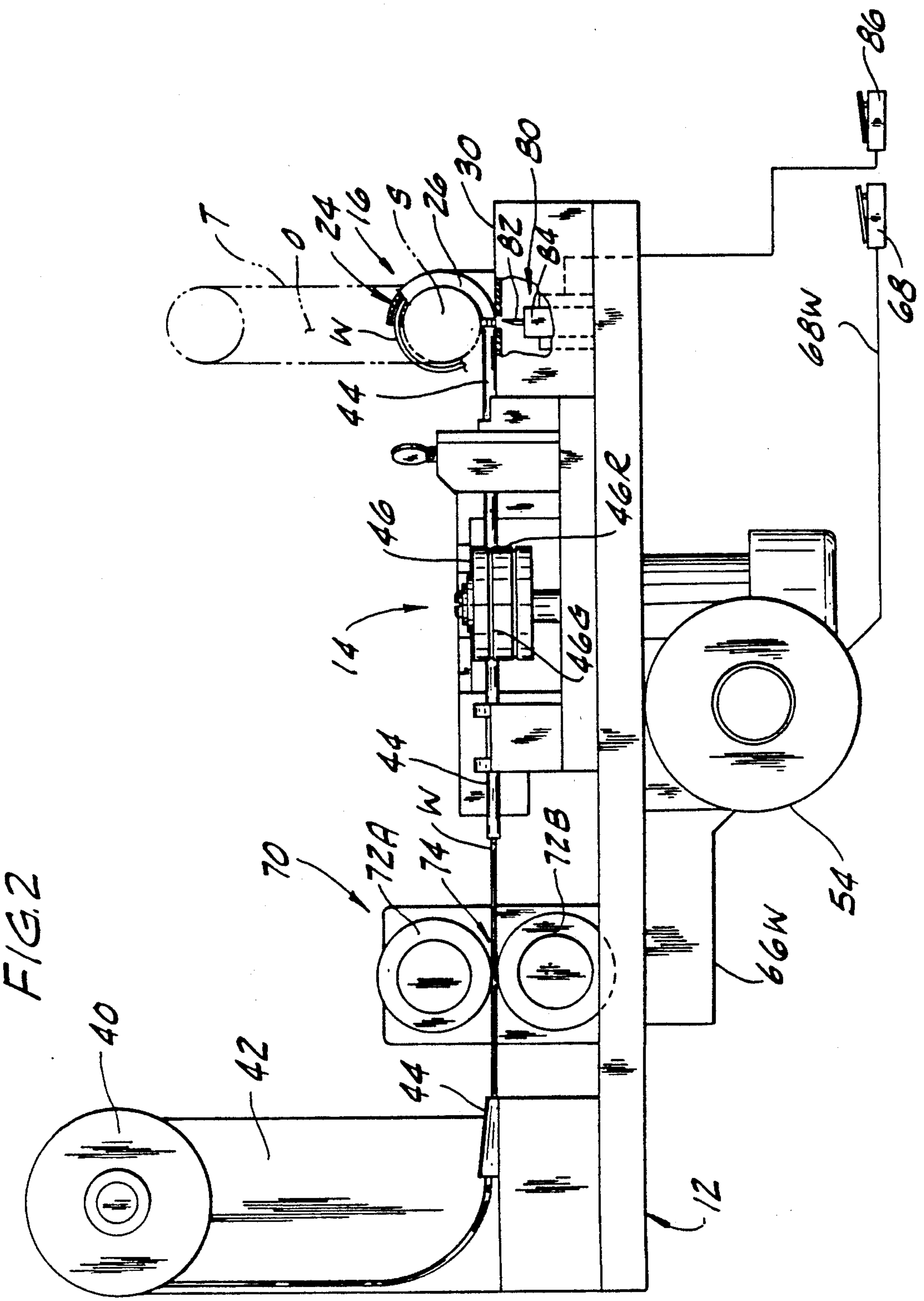
FIG. 2 is a side elevation of the apparatus.

Referring now to the drawings and in particular to FIGS. 1 and 2, apparatus 10 for forming a toroid coil around a toroidal body T is shown to comprise a table 12 (broadly "a frame") supporting means 14 for feeding wire W forward in the direction of its length toward the toroidal body, and means comprising a die 16 for constraining the wire to bend it as it is fed forward into the convolutions of a helix. The wire feeding means 14 pushes the wire forward along a path which at the toroidal body T, as may be seen in FIG. 2, is generally tangent to the toroidal body surface and nonparallel to the radial plane of the toroidal body. The wire W is formed as it is driven into the die 16 into a helix which winds around the toroidal body surface with its convolutions extending through the opening O in the toroidal body. As more wire W is driven into the die 16, the turns A of wire already formed are pushed along the toroidal body T in the direction indicated by arrow 20 in FIG. 3. The turns of wire A follow the toroidal body's circumference to shape the helical convolutions formed by the die 16 into a toroid coil. The toroid coil so formed has an inside diameter substantially corresponding to the outside dimension of a cross section S of the toroidal body surface.

The die 16 has a wire forming path 24 defined in it, which preferably has the shape of a segment of a helix. In the first embodiment, (FIGS. 1 and 2), the die 16 takes the form of a tubular member 26. The wire forming path 24 is on the inside of the tubular member 26 and thus largely obscured, however the shape of the path is clearly indicated by the external contour of the tubular member, as may be seen in FIG. 2. Where the die 16 is a tubular member 26, the wire forming path 24 is shaped by forming the tubular member into a segment of a helix. Thus, wire W driven through the die 16 along the wire forming path 24 by the wire feeding means 14 is continuously formed into the convolutions of a helix. The pitch of the wire forming path 24 is such that the adjacent turns A of coil formed in the die 16 are offset a predetermined distance (e.g., approximately one wire diameter), depending upon the number of turns of coil to be wound on the toroidal body T. It is to be understood that non-helical wire forming paths are also contemplated by the present invention. For instance, the wire forming path may lie entirely in a plane. The planar turns of wire formed in such a wire forming path would then each be deflected laterally by structure (not shown) separate from the die to form the planar turns of wire into a helical coil.

Figure 3:
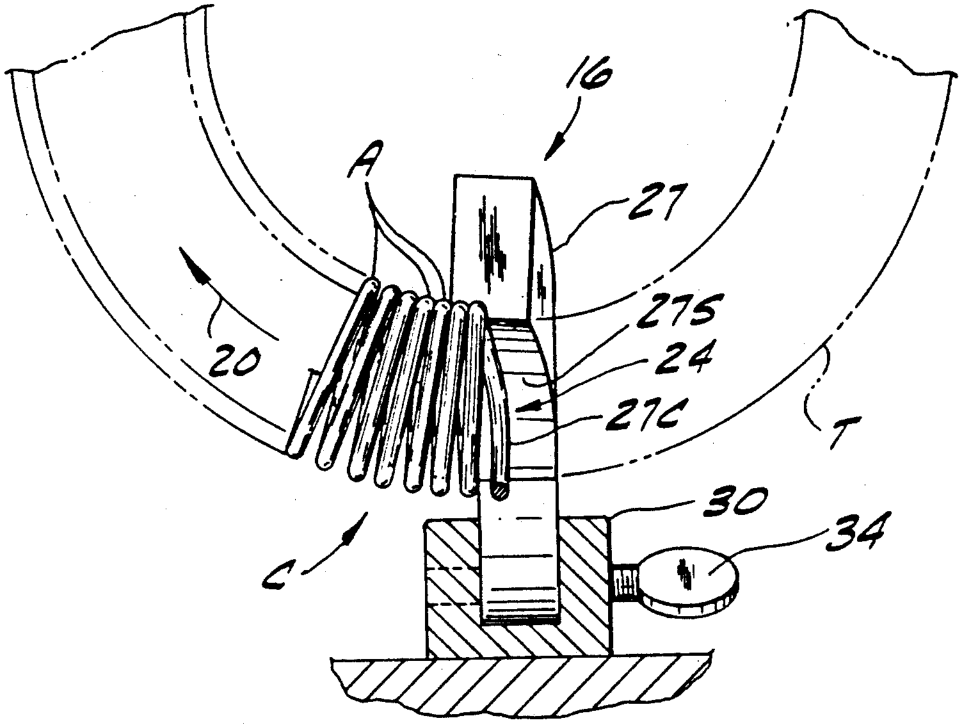
FIG. 3 is a fragmentary section of the apparatus taken in the plane including line 3—3 of FIG. 1 and showing a die of a second embodiment of the apparatus.
Figure 5:
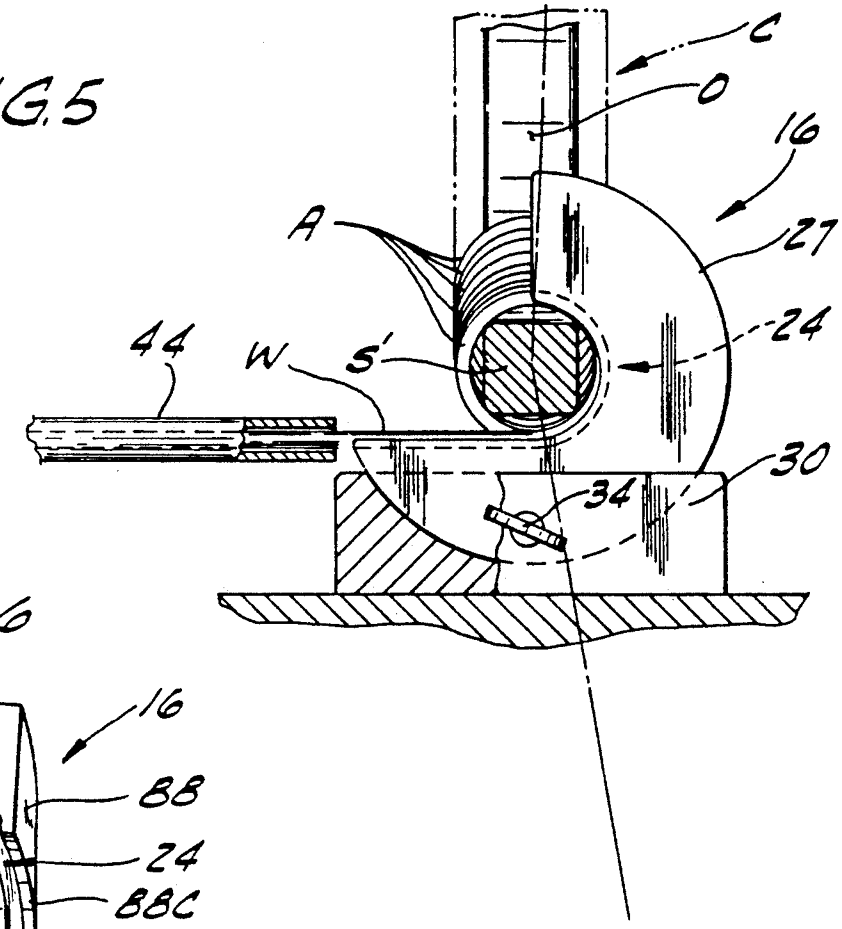
FIG. 5 is a fragmentary side elevation of the apparatus winding a body having a rectangular cross section.

Referring now to FIGS. 3 and 5, a die 16 of a second embodiment of the present invention is shown. The die 16 takes the form of a bending anvil 27 with the wire forming path 24 being formed as a channel 27C of U-shaped cross section on the concave inner surface 27S of the bending anvil. The die 16 is formed from a cylindrical steel bar (not shown) which is bored endwise with the channel 27C being cut into the wall of the bore. The steel bar is then cut into a ring including the internal channel 27C. A section of the ring is cut away to expose the channel 27C and one end of the die 16 is twisted with respect to the other to form the channel 27C into a wire forming path 24 having the shape of a segment of a helix. Alternatively, a helical thread is cut in the interval wall of the bore in which case twisting of the die is unnecessary. The die 16 thus formed is then hardened. Wire W fed to the bending anvil 27 is received in the channel 27C, and formed as it travels along the channel into a helix. The inner diameter of the toroid coil C may more closely correspond to the outside dimension of the toroidal body T using the die 16 of FIGS. 3 and 5 than for toroid coil C formed by the die 16 of FIGS. 1 and 2. The die 16 of FIGS. 3 and 5 forms the convolutions directly against the toroidal body surface. With the die 16 of FIGS. 1 and 2, the wire W and toroidal body are separated by the width of the wall of the tubular member 26 adjacent the toroidal body T, thus causing the radius of curvature of the convolutions formed to be greater than the cross sectional dimension of the toroidal body by at least the thickness of the wall.

As shown in FIGS. 2 and 5, when the toroidal body T is positioned for winding the toroid coil C, the die 16 and hence the wire forming path 24 extends generally around a portion of the perimeter of the cross section (S, or S') of the toroidal body surface. Of course, because of the helical shape of the wire forming path 24, it bends slightly out of the plane of the cross section S as it extends generally around a portion of its perimeter. It is preferable, primarily as a matter of product appearance and ease of installation in electrical equipment, to have the inside diameter of the toroid coil C correspond to the outside dimension of the toroidal body T. Where the toroidal body is of the type having a circular cross section S, as shown in FIGS. 2 and 3, a tightly wound coil is formed by having the radius of curvature of the wire forming path 24 substantially equal to the cross sectional radius of the toroidal body.

Figure 4:
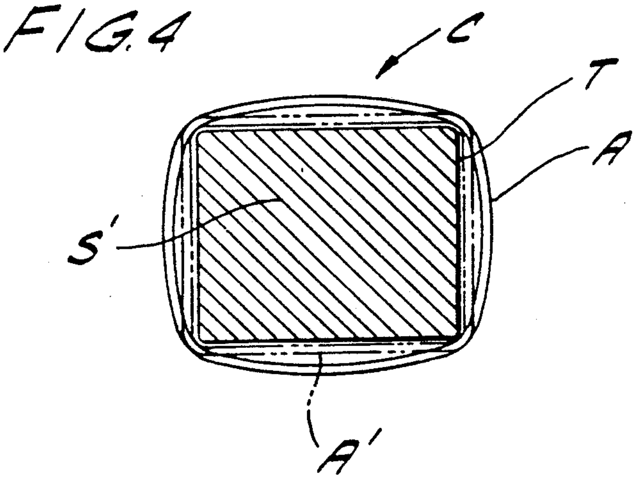
FIG. 4 is a radial cross section of a toroidal body wound according to the method of the present invention, with the prior art winding illustrated in phantom.

If, however, the toroidal body T has a rectangular or polygonal cross section S' (FIG. 5), tightness of the winding is optimized by having the radius of curvature of the wire forming path 24 substantially equal to one half the diagonal dimension of the cross section S' of the toroidal body. Good results have been achieved when the ratio of the greater of the height or width of the rectangular cross section S' to the lesser of the height or width of the cross section is generally between 1 and 1.5. In this range, the spacing between the inside of the toroid coil C and the toroidal body surface is small enough that a relatively tight wind may be achieved so that the magnetic coupling between the toroidal coil C and the toroidal body T is maximized. However, even in optimal situations, the helical convolutions formed by the die 16 cannot exactly follow the contour of a toroidal body with a rectangular cross section S'. As shown in FIG. 4, even after tightening the coil C wound by the apparatus 10, the turns A each still gap from the sides of the toroidal body T. Although toroid coils C wound on toroidal bodies T of rectangular cross section S' will be somewhat looser than those wound on toroidal bodies of circular cross section S, the coil may be tightened after forming as described more fully below. Previous winding machines, because they employed toroidal body itself as a bending anvil, produced turns of coil A' (shown in phantom in FIG. 4) which closely followed the contour of a toroidal body of rectangular cross section S'. However, an inductor formed by the present invention electrically functions equally well and can be formed more quickly and inexpensively than inductors formed by existing machines.

Figure 6:
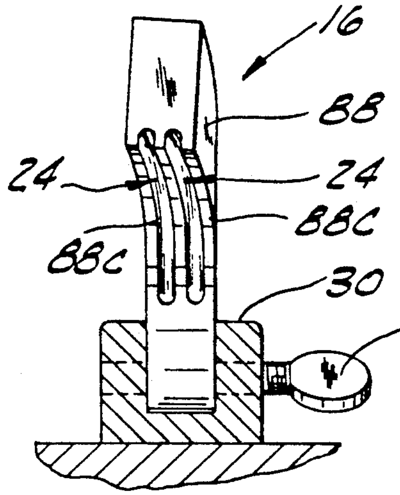
FIG. 6 is a front elevation of a die of the apparatus for use in forming bifilar transformers.

To accommodate toroidal bodies of different cross sectional dimensions, a plurality of interchangeable dies (not shown) are provided. In the embodiment of FIGS. 1 and 2, the die 16 is mounted on a base 30 connected to the table 12 by suitable fasteners 32. The die 16 and base 30 may be removed and replaced with a different die and base which are the same in all respects as those just removed except the radius of curvature of the new die corresponds to the cross sectional radius of the particular toroidal body T to be wound. In the embodiments of FIGS. 3, 5 and 6, the die 16 is releasably fixed by a set screw 34 in a base 30 mounted on the table 12. Other suitable means for releasably securing a die 16 to the table 12 may also be employed.

As wire W is driven through the die 16, the turns A of wire already formed advance circumferentially around the toroidal body T, as indicated by arrow 20 in FIG. 3, while the toroidal body and the die remain stationary. In this way, the helical coil of wire formed by the die 16 is shaped into a toroid coil C. Therefore, it is not necessary to rotate the toroidal body T or the die 16 to change their relative angular positions during the toroid coil forming process.

The angular extension 2 of the wire forming path 24, and hence of the die 16, around the perimeter of the cross section (S or S') of the toroidal body T is sufficiently great so that the wire W fed into the die 16 is bent beyond its yield point. What constitutes a sufficient angular extension depends upon the properties of the wire material. However, for copper wire, it has been found that an angular extension 2 of the die 16 of approximately 110° is great enough to assure plastic deformation of the wire W in the die. Of course, the angular extension of the die 16 may be greater or less than 110° and still fall within the scope of the present invention. The angular extension of the die 16 should be sufficiently small so that the toroidal body T may be quickly and easily positioned against the concave inner side of the die, as shown in FIGS. 2 and 5. Thus, it may be seen that the present invention uses a die 16 to bend wire W into a helix extending around the perimeter of the cross section (S or S') of the toroidal body rather than using the toroidal body itself to bend the wire into turns of coil, as in existing toroid coil winding machines.

Wire W for forming into the toroid coil C around the toroidal body T is initially stored on a spool 40 mounted for rotation on a pedestal 42 attached to the table 12. The wire W from the spool 40 passes through several tubular guides 44 on its way to the die 16. The wire feeding means 14 of the present invention is adapted from the wire feeder used with a mig welder to feed metal filler in the form of heavy wire to the welder. The wire feeding means 14 includes first and second wheels, indicated at 46 and 48, respectively, mounted for rotation on parallel axes. The wheels have circumferentially extending rolling surfaces 46R, 48R which are closely spaced at a point along their circumferences to define a nip 50. Referring to FIG. 1, the rolling surfaces 46R, 48R have corresponding grooves (only a groove 46G in the first wheel is shown) into which the wire W is received at the nip 50. A motor 54 powers rotation of the first wheel 46. The second wheel 48 is mounted on a lever 56 pivotally mounted by a suitable hinge pin 58 on the table 12, so that the rolling surface 48R second wheel may move toward and away from the rolling surface 46R of the first wheel to vary the size of the nip 50. A spring 60 biases the second wheel 48 toward the first wheel 46 so that the rolling surfaces of the drive wheels are constantly in engagement with the wire W received in the nip 50.

Control means for selectively activating the motor to feed wire W forward toward the toroidal body T includes a controller 66 connected by wire 66W to the motor 54 and a foot switch 68 connected by a wire 68W. Means 70 for measuring the length of wire W being fed is located between the spool 40 and the drive wheels 46,48. The measuring means 70 is of the type commonly used in paper mills to measure the length of paper drawn past a certain point. The measuring means 70 includes two wheels 72A, 72B defining a nip 74 through which the wire W passes. The longitudinal motion of the wire W toward the toroidal body T rotates the wheels 72A, 72B which causes the measuring means 70 to generate pulses counted by the controller 66. The controller 66 is responsive to the measuring means 70, for example, by counting a predetermined number of pulses generated by the measuring means 70, to automatically deactivate the motor 54, stopping the drive wheels 46, 48 when the length of wire W fed equals a preset amount, i.e. when the generated pulses equals the predetermined number. The controller 66 may be preset so that the number of counts before cutoff of the motor corresponds to a predetermined number of turns A of coil formed on the toroidal body T. The controller 66 may also be adapted to slow the motor before stopping it for more precise control of the length of wire W fed to the die 16. The foot switch 68 may be depressed by the operator to restart the motor 54 to begin winding the next toroidal body T. Alternatively, controller 66 may directly control motor 54. For example, motor 54 may be a stepper motor which is pulsed by controller 66 to drive the wire W a preset amount, in which case measuring means 70 may not be needed.

As best seen in FIG. 2, cutter means 80 is positioned under the path of the wire W between the wire feeding means 14 and the toroidal body T. The cutter means 80 includes a blade 82 telescopically received in a housing 84 and adapted for rapid extension from the housing to cut the wire W generally adjacent the lower end of the die 16 and the toroidal body T. The rapid extension of the blade 82 may be driven by the force of compressed air or other suitable means. By cutting the wire W, the toroid coil C formed on the toroidal body T is separated from the wire stored on the spool 40 so that the wound toroidal body may be removed from the apparatus 10. A foot switch 86, constituting means for actuating the extension of the blade in this embodiment, is depressed by the operator to cut the wire W. The cutter means 80 may be interchanged with other cutter means (not shown) as needed to cut the particular kind and size of wire being used. As an alternative to using the cutter means just described, the operator of the apparatus 10 may manually cut the wire W with a pair of wire cutters (not shown) upon completion of formation of the toroid coil C. In that instance, the wire W may be cut near the top of the die 16 so that wire is left in the die after formation of the toroid coil C.

Figure 7:
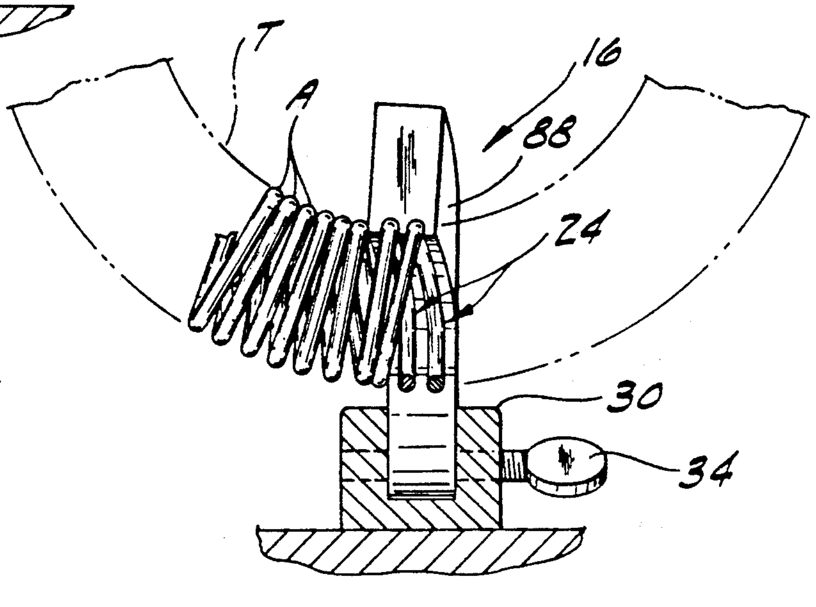
FIG. 7 is a front elevation of the die of FIG. 6 showing simultaneous formation of primary and secondary windings of a bifilar transformer by apparatus of the present invention.

By cutting two channels 88C in the die 16, a bending anvil 88, shown in FIG. 6, for winding bifilar transformers is formed. In order to simultaneously form both windings, the wire feeding means 14 of the present invention would include a second source of wire and a second set of drive wheels (not shown). The second source of wire and the second drive wheels would be identical to the first, but located rearwardly (to the left as seen in FIGS. 1 and 2) of the wire feeding means 14 previously described herein. Wire driven by the second drive wheels would travel into a guide tube passing under the drive wheels 46, 48 to the bending anvil 88. The wire feeding means would be activated so that wire is fed by both pairs of drive wheels into respective channels 88C of the bending anvil 88 to simultaneously form a primary and a secondary winding of the bifilar transformer, as is shown in FIG. 7. Rather than forming two channels in a single die, two dies (not shown) may be used. The dies would be placed together on the apparatus 10 with wire being simultaneously fed into each die.

Figure 8:
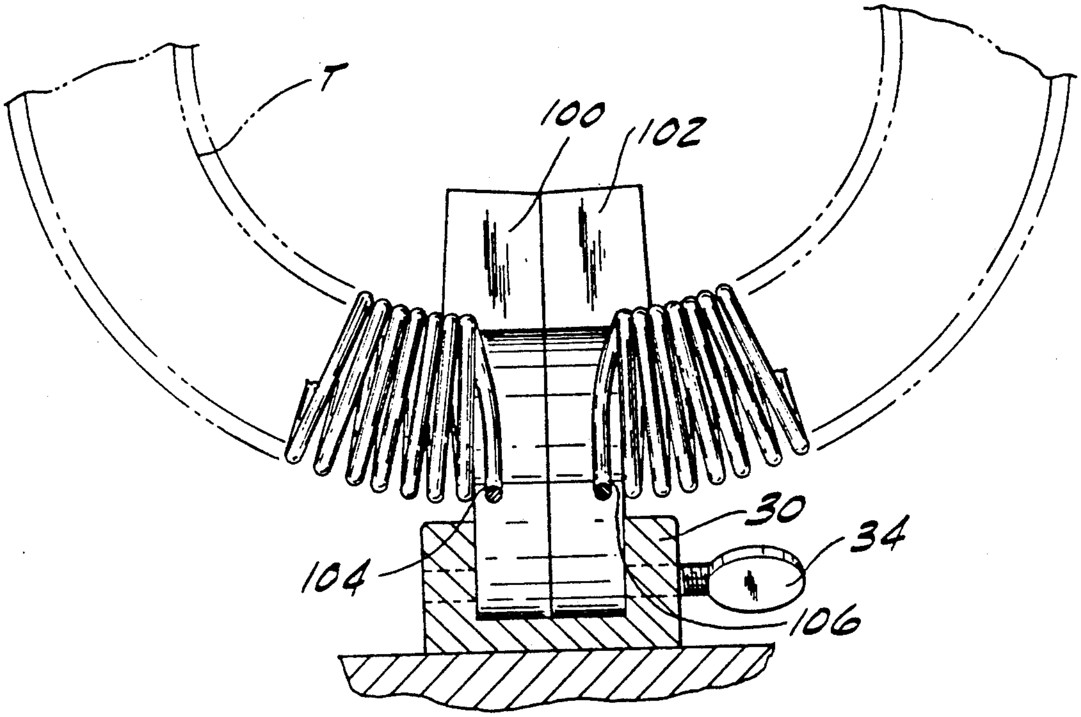
FIG. 8 is a front elevation of dies used for forming two coils which advance in opposite directions around the toroidal body.

The second wire feed means may also be used to form an inductor with two windings, each extending half way around the circumference of the toroidal body. As shown in FIG. 8, a pair of dies (designated 100 and 102, respectively) each have a wire forming path (designated 104 and 106, respectively) formed therein. A first of the wire forming paths 104 has a pitch which is opposite in direction to the pitch of a second of the wire forming paths 106. The dies 100 and 102 are mounted on the table 12 adjacent each other and wire simultaneously fed to both dies. The coils formed by the respective dies are wound in the same direction, but advance in opposite directions around half the circumference of the toroidal body.

The method of the present invention for producing the inductor of the present invention is as follows. Wire W from the spool is threaded through the tubular guides 44, between the measuring wheels 72A, 72B, and between the drive wheels 46, 48 to the die 16. The operator then places the toroidal body T made of magnetic material adjacent the inner concave surface of the die 16 as shown in FIG. 2. Controller 66 is set for a predetermined length corresponding to the desired number of turns. The foot switch 68 is depressed activating the motor 54 for rotation of the first wheel 46 to drive the wire W toward the toroidal body T. At the toroidal body, the wire W is constrained by the die 16 along a wire forming path 24 to bend into the convolutions of a helix extending through the opening O in the toroidal body and advancing circumferentially around the toroidal body to form the toroid coil C. Where bifilar winding is desired, a second wire is fed from second wire feeding means to a bifilar winding bending anvil 88 (FIG. 6). The two wires fed to the bending anvil 88 are received in respective channels 88C, constituting wire forming paths 24, formed in the inner concave surface of the bending anvil.

As the wire W is fed forward, the length of wire being fed is measured by the measuring means 70. The forward motion of the wire W is stopped by a signal from the controller 66 to the motor 54 when the length measured by the measuring means 70 reaches the predetermined length. The wire W is then cut generally adjacent the toroidal body T by depressing the foot switch 86 which actuates rapid extension of the blade 82 from its housing 84. As previously stated, as an alternative to the cutter means 80, wire cutters may be used by the operator to sever the wire W adjacent the top of the die 16, thus leaving wire in the die for formation of the next toroid coil C. In this way, the toroid coil C is separated from the wire extending from the spool 40.

In some instances it may be desirable to tighten the toroid coil C around the toroidal body T after it is formed by the apparatus 10. This is more likely to occur when the cross section S' of the toroidal body is rectangular, and gaps are left between the coil formed by the apparatus 10 and the surface of the toroidal body T. Where the toroidal body T has a circular cross section S, tightening is not normally required. The free end of the toroid coil C is first grasped, such as with pliers, and pulled to tighten the turns A of the toroid coil around the toroidal body surface. The wire W is then cut adjacent the die 16. The free end of the toroid coil C is fixed in position and the cut end opposite the free end is grasped and pulled. At the same time, the turns A of coil are manually rotated in a direction which feeds wire W toward the cut end of the toroid coil C to tighten the coils around the toroidal body T. The tightening operation may be performed in a matter of seconds, and does not significantly delay production. It has been found that unit production time is still lower than that for existing automatic toroid coil winding apparatus even including the time taken to tighten.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A system for forming a wire wound toroid core comprising, a toroidal body, means for feeding wire forward in the direction of its length toward the toroidal body along a path, the toroidal body being disposed relative to the path such that at the toroidal body the path is generally tangent to the surface of the toroidal body, and means for constraining the wire as it is fed forward such that said wire is bent into the convolutions of a helix, said constraining means being shaped for receiving the toroidal body such that the convolutions wind around the toroidal body surface with the convolutions extending through the opening in the toroidal body, the wire in the convolutions engaging the toroidal body surface to deflect the path of the convolutions such that the convolutions advance circumferentially around the toroidal body to form the toroid coil on the toroidal body.

2. A system as set forth in claim 1 wherein said means for constraining comprises a die having a wire forming path defined therein.

3. A system as set forth in claim 2 wherein the wire forming path has the shape of a segment of a helix.

4. A system as set forth in claim 3 wherein the wire forming path has an angle of pitch such that the centerlines of the wire in adjacent turns of the toroid coil formed by the die are offset a predetermined distance.

5. A system as set forth in claim 2 wherein the angular extension of the wire forming path generally around the perimeter of the radial cross section of the toroidal body is approximately 110°.

6. A system as set forth in claim 2 wherein the wire forming path extends around the perimeter of the radial cross section of the toroidal body an angular distance of greater than or equal to approximately 110 degrees and less than or equal to approximately 160 degrees, thereby to deform the wire beyond its yield point.

7. A system as set forth in claim 2 wherein the die comprises a bending anvil and wherein said wire forming path comprises a channel formed in the bending anvil.

8. A system as set forth in claim 7 wherein the channel is generally U-shaped in cross section.

9. A system as set forth in claim 2 wherein the die comprises a tubular member.

10. A system as set forth in claim 2 wherein the toroidal body has a circular cross section, and wherein the wire forming path is adapted to extend generally circumferentially around a portion of said circular cross section, the radius of curvature of the wire forming path corresponding to the radius of said circular cross section whereby the toroid coil formed on the toroidal body has an inside diameter substantially corresponding to the outside diameter of said circular cross section.

11. A system as set forth in claim 2 wherein the toroidal body has a generally rectangular cross section, and wherein the wire forming path is adapted to extend generally around a portion of the perimeter of a cross section of the toroidal body, the radius of curvature of the wire forming path generally corresponding to one half of the length of the diagonal dimension of said rectangular cross section.

12. A system as set forth in claim 11 wherein the ratio of the greater of the height or width of said rectangular cross section of the toroidal body to the lesser of the height of width of said cross section is generally between 1 and 1.5.

13. A system as set forth in claim 2 further comprising a frame supporting the die, the die being releasably mounted on the frame for interchanging the die with other dies.

14. A system as set forth in claim 2 further comprising a frame, and a plurality of interchangeable dies adapted to be releasably mounted on the frame.

15. A system as set forth in claim 1 further comprising cutter means for cutting the wire to separate the toroid coil formed by the apparatus from a supply of wire.

16. A system as set forth in claim 15 wherein said cutter means comprises a blade telescopically received in a housing and adapted for rapid extension from said housing to cut the wire at a point between said means for constraining and said wire feeding means, and means for actuating the rapid extension of the blade.

17. A system as set forth in claim 1 wherein said wire feeding means comprises first and second drive wheels mounted for rotation on parallel axes, the wheels having circumferentially extending rolling surfaces which are closely spaced at a point along their circumferences to define a nip adapted to receive the wire therein, and a motor to rotate said first drive wheel.

18. A system as set forth in claim 17 further comprising control means for selectively activating the motor, and means for measuring the length of wire being fed by said wire feeding means, said control means being responsive to said measuring means to automatically deactivate the motor when the length of wire measured by said measuring means reaches a predetermined value.

19. A system as set forth in claim 1 further comprising control means for selectively activating said wire feeding means to feed wire forward in the direction of its length, and means for measuring the length of wire being fed by said wire feeding means, said control means being responsive to said measuring means to automatically deactivate said wire feeding means when the length of wire measured by said measuring means reaches a predetermined value.

20. A system for forming a toroid coil on a toroidal body comprising, means for feeding wire forward int he direction of its length toward the toroidal body along a path which at the toroidal body is generally tangent to the surface of the toroidal body, and means for constraining the wire as it is fed forward such that said wire is bent into the convolutions of a helix, said helix winding around the toroidal body surface with the convolutions extending through the opening int he toroidal body and advancing circumferentially around the toroidal body to form the toroid coil on the toroidal body;

said means for constraining comprising a die having a pair of parallel wire forming paths defined therein, said wire feeding means being adapted to simultaneously feed wire to both of said wire forming paths thereby simultaneously forming primary and secondary toroid coils in a bifilar configuration on the toroidal body.

21. A system as set forth in claim 20 wherein each wire forming path has an angle of pitch such that the centerlines of the wire in adjacent turns of each toroid coil are offset by at least two wire diameters.

22. A system for forming a toroid coil on a toroidal body comprising, means for feeding wire forward in the direction of its length toward the toroidal body along a path which at the toroidal body is generally tangent to the surface of the toroidal body, and means for constraining the wire as it is fed forward such that said wire is bent into the convolutions of a helix, said helix winding around the toroidal body surface with the convolutions extending through the opening in the toroidal body and advancing circumferentially around the toroidal body to form the toroid coil on the toroidal body;

said means for constraining comprising two dies each die having a wire forming path defined therein, one of the wire forming paths having a pitch which is opposite in direction to the pitch of the other of the wire forming paths, said wire feeding means being adapted to simultaneously feed wire to both of said wire forming paths thereby simultaneously forming primary and secondary toroid coils on the toroidal body.

* * * * *